United States Patent [19]
Heine et al.

[11] Patent Number: 6,139,023
[45] Date of Patent: Oct. 31, 2000

[54] SEAL FOR MOVABLE STRUCTURAL COMPONENTS

[75] Inventors: Steffen Heine, Stadt Wehlen; Michael Kinzel, Badendorf; Heiko Schumacher, Bad Oldesloe, all of Germany

[73] Assignee: Dichtungstechnik G. Bruss GmbH & Co. KG, Hoisdorf/Hamburg, Germany

[21] Appl. No.: 09/058,146

[22] Filed: Apr. 10, 1998

Related U.S. Application Data

[62] Division of application No. 08/559,950, Nov. 17, 1995, Pat. No. 5,756,025.

[30] Foreign Application Priority Data

Nov. 25, 1994 [DE] Germany .......................... P 44 42 080

[51] Int. Cl.$^7$ .................................................. F16J 15/32
[52] U.S. Cl. ...................... 277/551; 277/570; 277/575; 277/576; 277/936; 277/944
[58] Field of Search ................... 277/549, 551, 277/570, 572, 575, 576, 936, 944; 249/83; 264/248, 259, 261, 271.1

[56] References Cited

U.S. PATENT DOCUMENTS

| | | | |
|---|---|---|---|
| 3,022,097 | 6/1956 | Seniff et al. | 277/356 |
| 3,127,182 | 10/1960 | Wardleigh | 277/616 |
| 3,250,541 | 5/1966 | McKinven | 277/576 |
| 3,545,770 | 12/1970 | Wheelock | 277/560 |
| 3,837,660 | 9/1974 | Poggio | 277/227 |
| 4,055,205 | 10/1977 | Withoff et al. | 144/281 R |
| 4,066,269 | 1/1978 | Linne | 277/575 |
| 4,124,676 | 11/1978 | Henzl | 264/250 |
| 4,131,285 | 12/1978 | Denton et al. | 277/309 |
| 4,190,258 | 2/1980 | Arai et al. | 277/554 |
| 4,194,748 | 3/1980 | Forch et al. | 277/560 |
| 4,243,235 | 1/1981 | Repella | 277/560 |
| 4,283,064 | 8/1981 | Staab et al. | 277/559 |
| 4,526,383 | 7/1985 | Fuchs et al. | 277/560 |
| 4,591,168 | 5/1986 | Holzer | 277/309 |
| 4,603,866 | 8/1986 | Fuchs et al. | 277/560 |
| 4,637,618 | 1/1987 | Valls | 277/560 |
| 4,746,128 | 5/1988 | Friewald | 277/349 |
| 5,039,112 | 8/1991 | Ulrich et al. | 277/562 |
| 5,198,053 | 3/1993 | Duncan | 156/64 |
| 5,383,728 | 1/1995 | Micca et al. | 384/482 |
| 5,425,543 | 6/1995 | Buckshaw et al. | 277/350 |
| 5,874,170 | 2/1999 | McKinven | 428/422 |

FOREIGN PATENT DOCUMENTS

| | | |
|---|---|---|
| 3246152 | 1/1985 | Germany . |
| 3619309 | 9/1987 | Germany . |
| 3710403 | 10/1988 | Germany . |
| WO9306394 | 4/1993 | WIPO . |

*Primary Examiner*—Anthony Knight
*Assistant Examiner*—Alison K. Pickard
*Attorney, Agent, or Firm*—Rogers & Killeen

[57] ABSTRACT

A seal for movable structural components, like piston rods or shafts, includes a carrier body made of thermoplastic material and a sealing member locked to said carrier body and made of polytetrafluoroethylene (PTFE) material. A form-lock connection is achieved by an undercut which is formed permanently in the sealing member and filled with plastic material of the carrier body.

12 Claims, 10 Drawing Sheets

SEAL FOR MOVABLE STRUCTURAL COMPONENTS

This is a divisional application of U.S. patent application Ser. No. 08/559,950, filed on Nov. 17, 1995, now U.S. Pat. No. 5,756,025.

BACKGROUND OF THE INVENTION

1. Field of the Invention

The invention relates to a seal for movable structural components such as piston rods or shafts.

2. Description of Prior Developments

A seal having a carrier body of plastic material and a polytetrafluoroethylene (PTFE) sealing member is known from DE 35 42 211 C2. In that case, cuts are formed in the sealing member before placing it in the injection mold for the formation of the carrier body. Those cuts are closed in the undeformed state of the sealing member and are opened when the sealing member is deformed as it is introduced into the injection mold. The injected plastic material is intended to make its way into those cuts so as to provide a connection in form lock between the carrier body and the PTFE sealing member. For that to be possible, the sealing member would have to be securely fixed in a deformed condition in the injection mold. However, that is not disclosed end, besides, it would be very expensive. Moreover, it would be a problem in the mass production of the known seal to assure the reproducible centering of the sealing member with respect to the structural. component to be sealed.

In another known seal (DE-OS 24 60 185) the sealing member is clamped in force lock between two metal parts, with the intermission position a rubber sealing disc.

EP 0 615 085 discloses an integrated shaft sealing ring which comprises a carrier body in the form of light die cast metal and a sealing member made of PTFE and vulcanized to the same through an elastomer.

SUMMARY OF THE INVENTION

It is an object of the invention to provide a seal, comprising a carrier body and a PTFE sealing member, which permits a direct, durable connection between the carrier body and the sealing member to be made in a simple way and in a reproducible manner which is suitable for large scale production. The object is met, in accordance with the invention.

In the case of one further development which is especially advantageous the sealing member is modified, prior to its placement in the injection mold, at least in that part of its surface area which is to be connected to the carrier body by incorporation of a plastic component which is identical or compatible with the plastic material of the carrier body. In this manner a substance-lock connection can be obtained during the injection molding between the PTFE sealing member and the carrier body, in addition to the form-lock connection. And that additional connection is characterized by an especially good static tightness.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
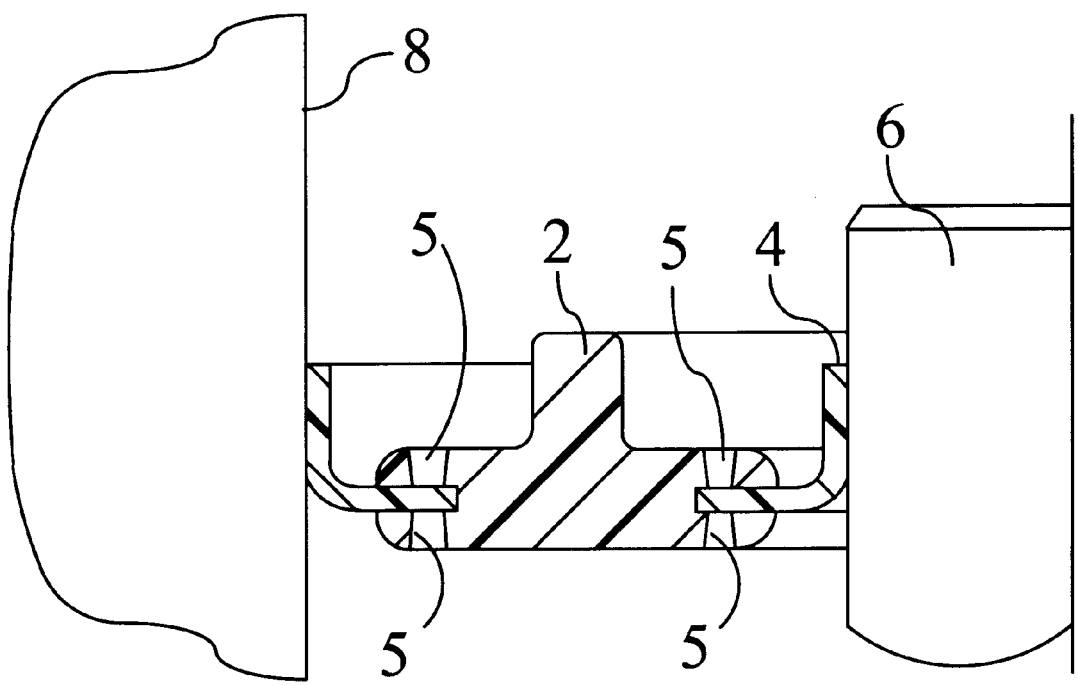
FIG. 1 is an axial semisection of a seal for a piston rod of a piston.
Figure 2:
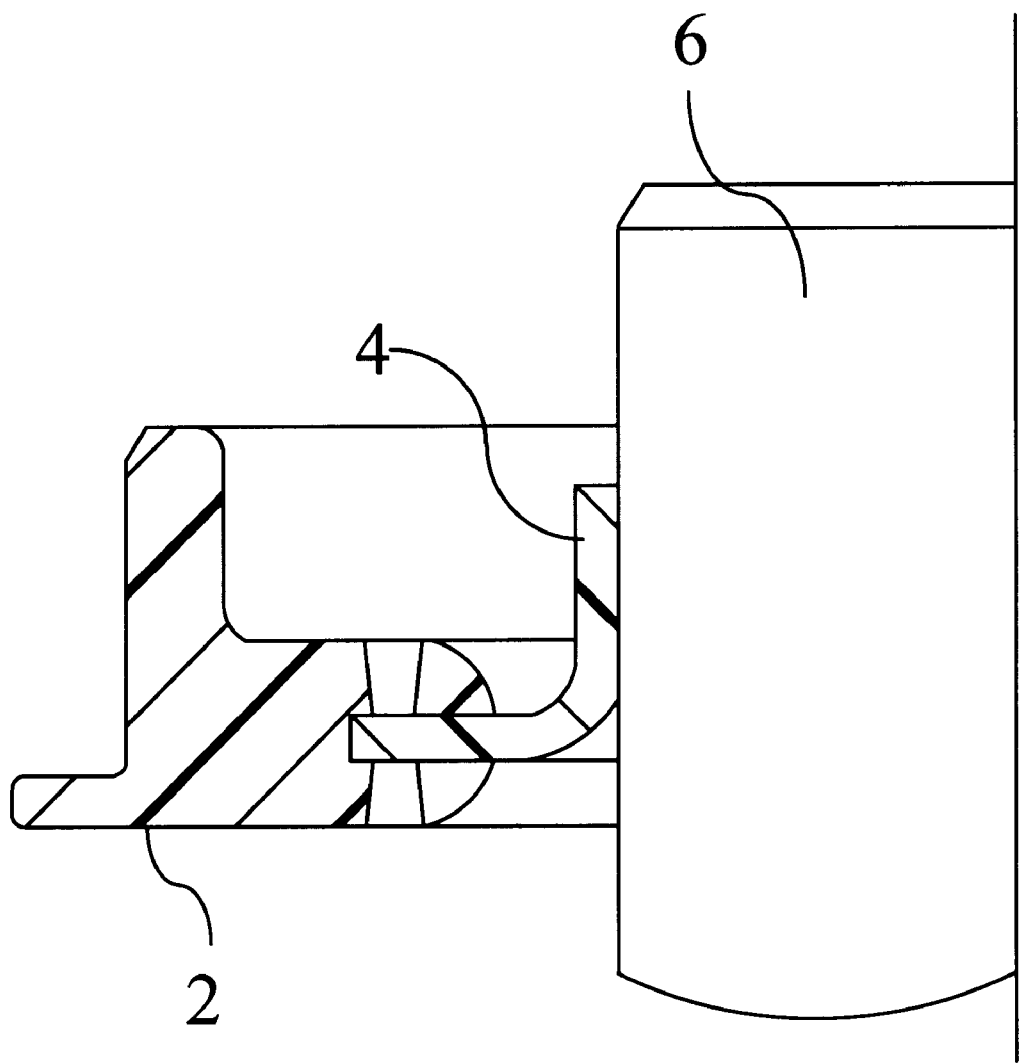
FIGS. 2 to 5 show different embodiments of seals for shafts, each in axial semisection.
Figure 3:
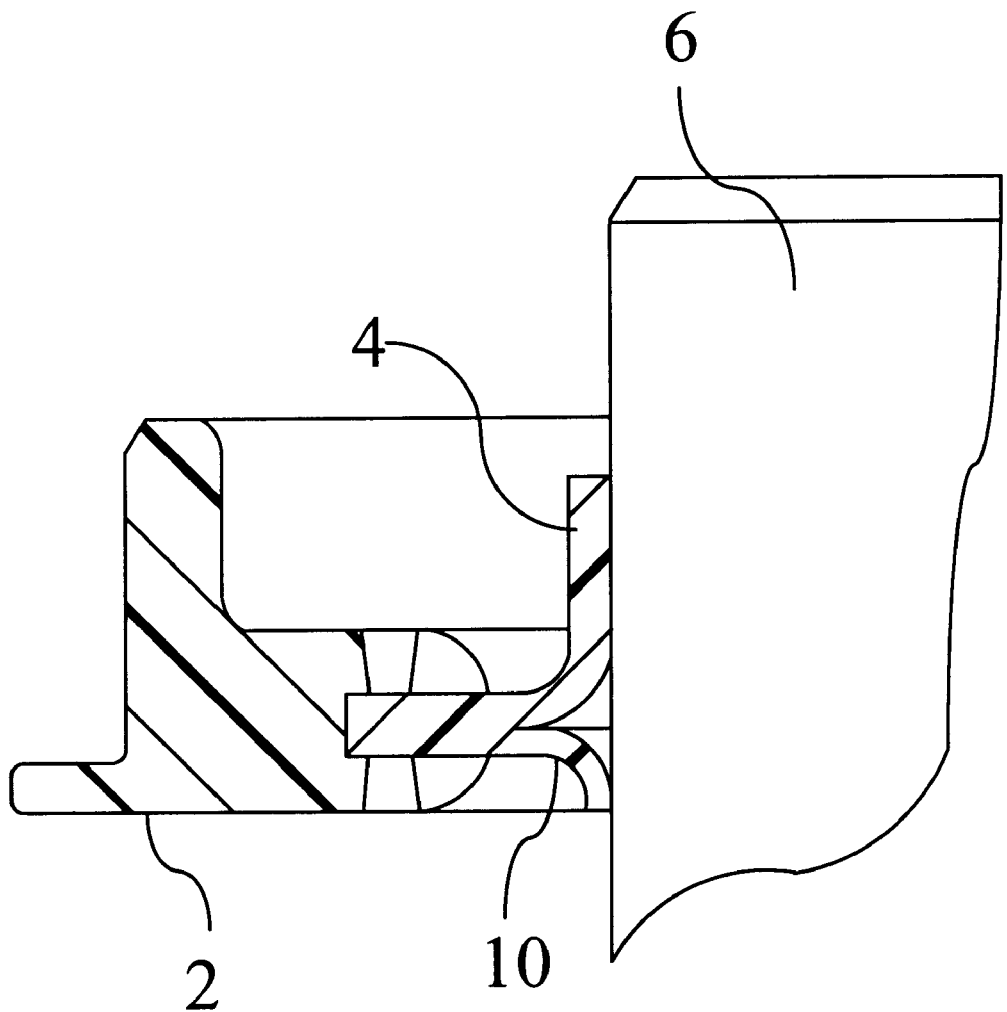
Figure 4:
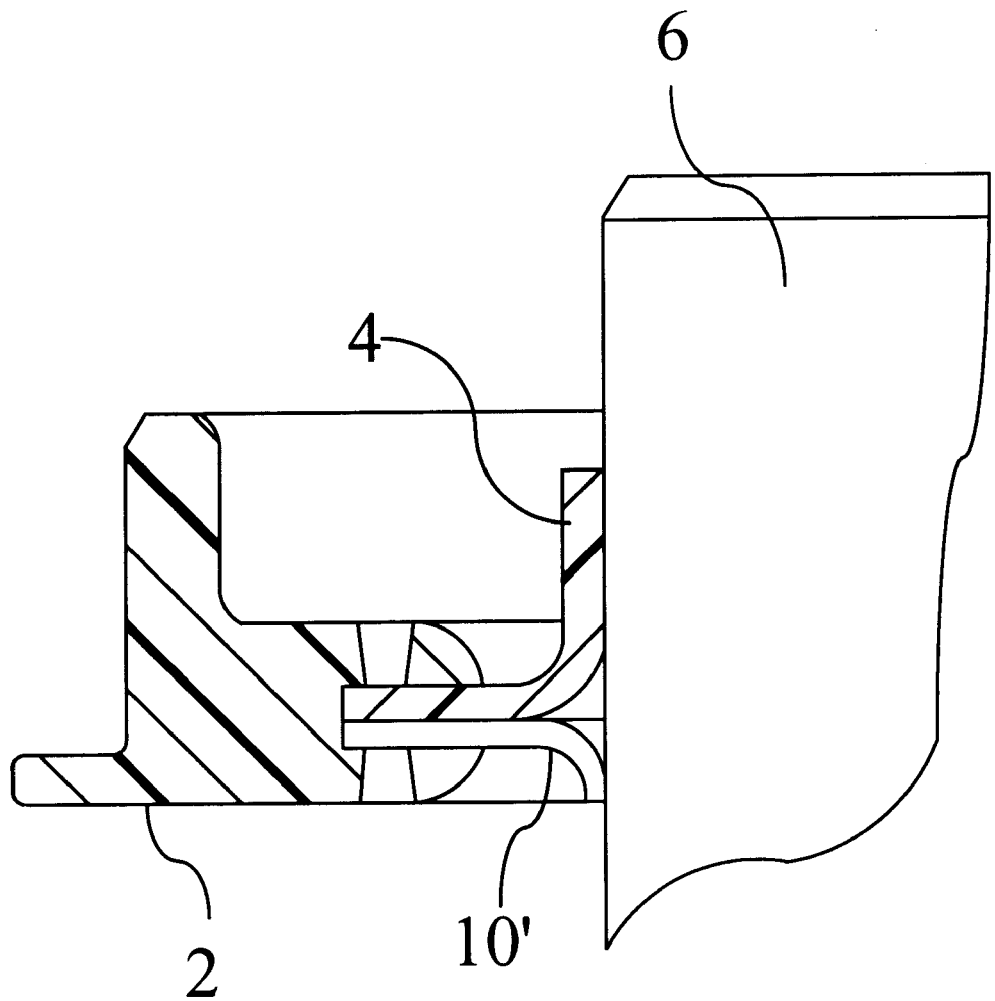
Figure 5:
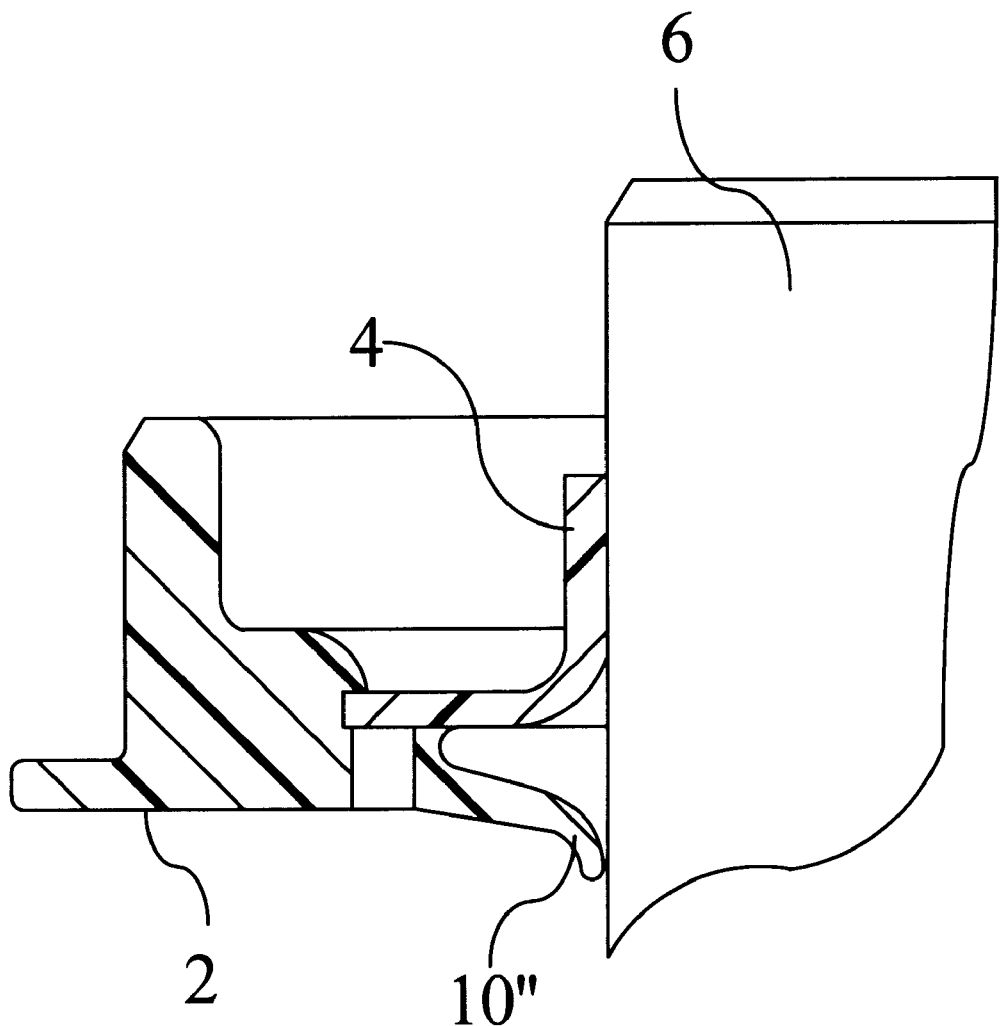
Figure 6:
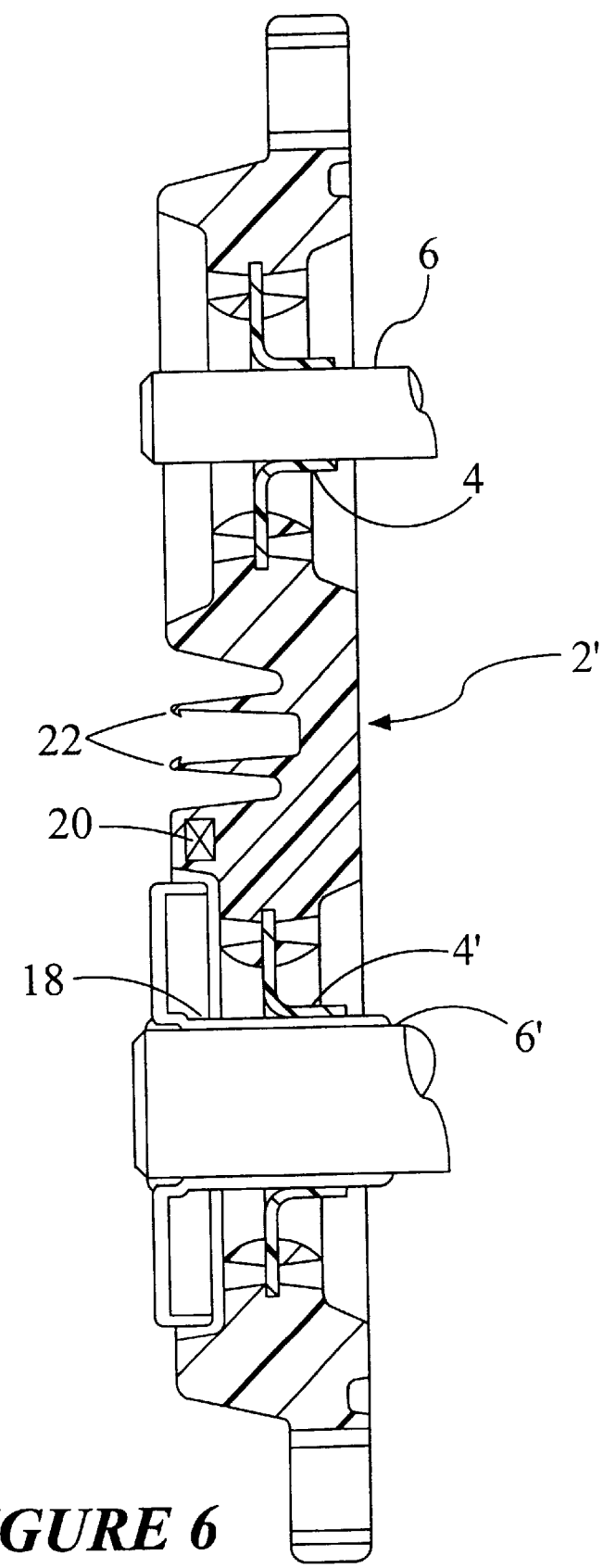
FIG. 6 is an axial sectional elevation of an integrated seal for two parallel shafts according to the invention.
Figure 7:
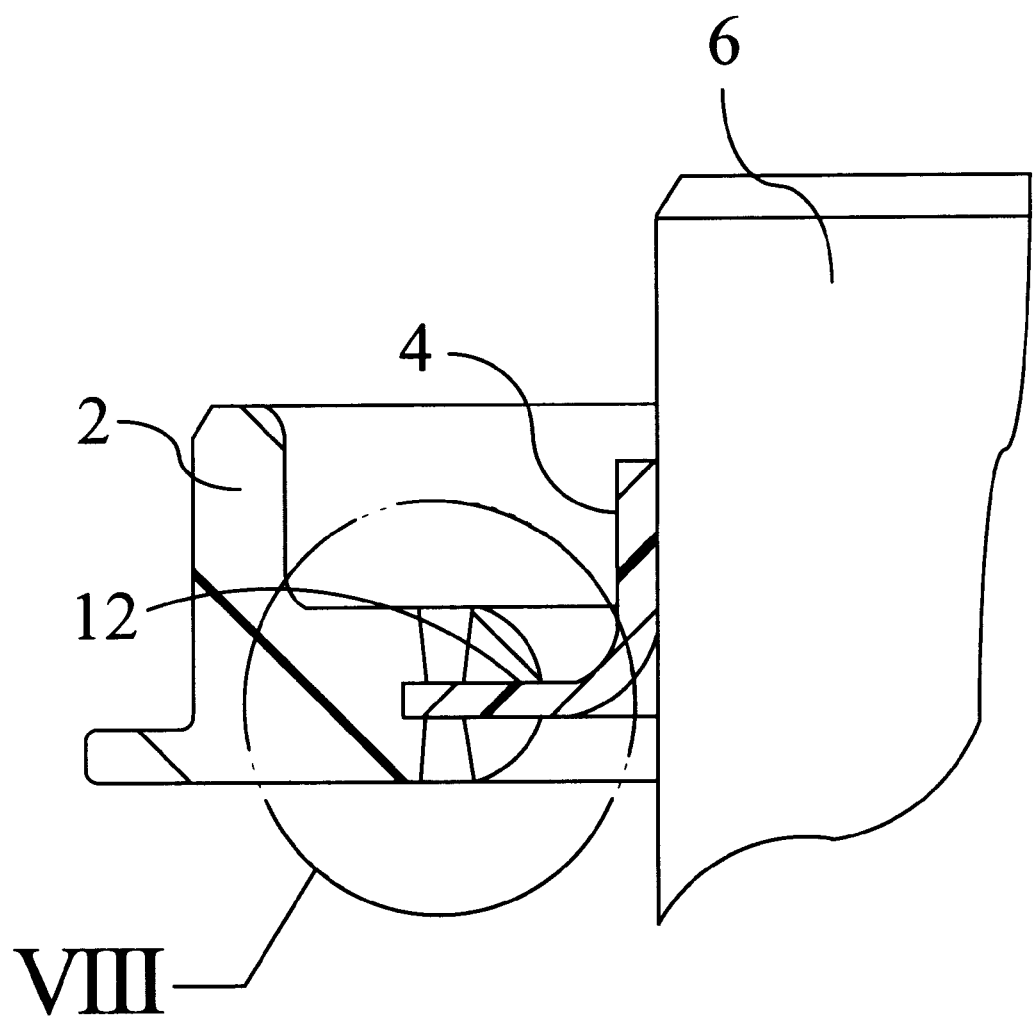
FIG. 7 shows a seal according to the invention as illustrated in FIG. 2, but with a form-lock connection between the sealing member and the carrier body.
Figure 8:
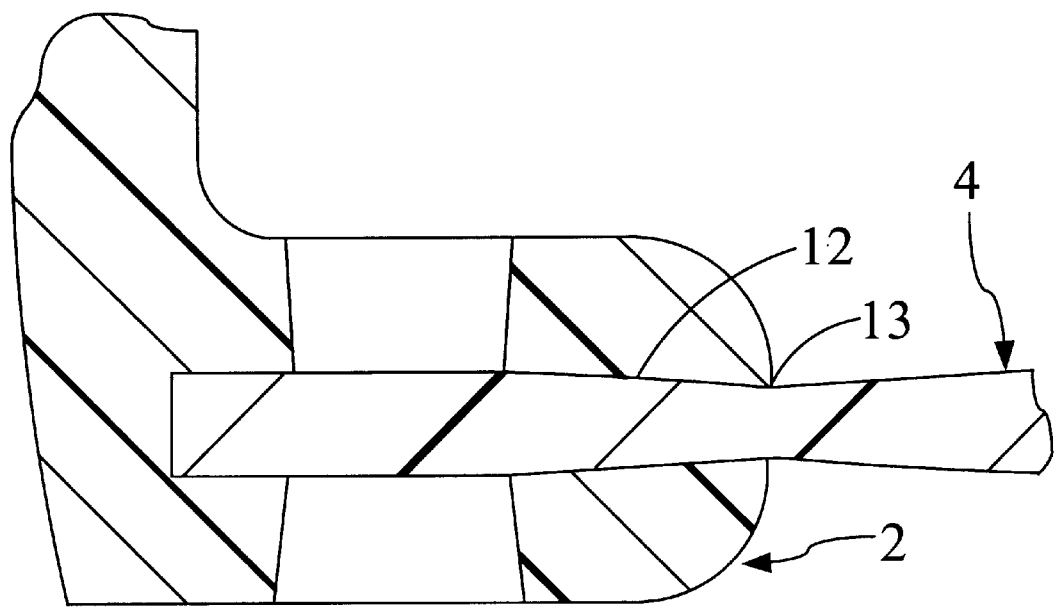
FIG. 8 shows the cutout marked VIII in FIG. 7 on an enlarged scale.
Figure 9:
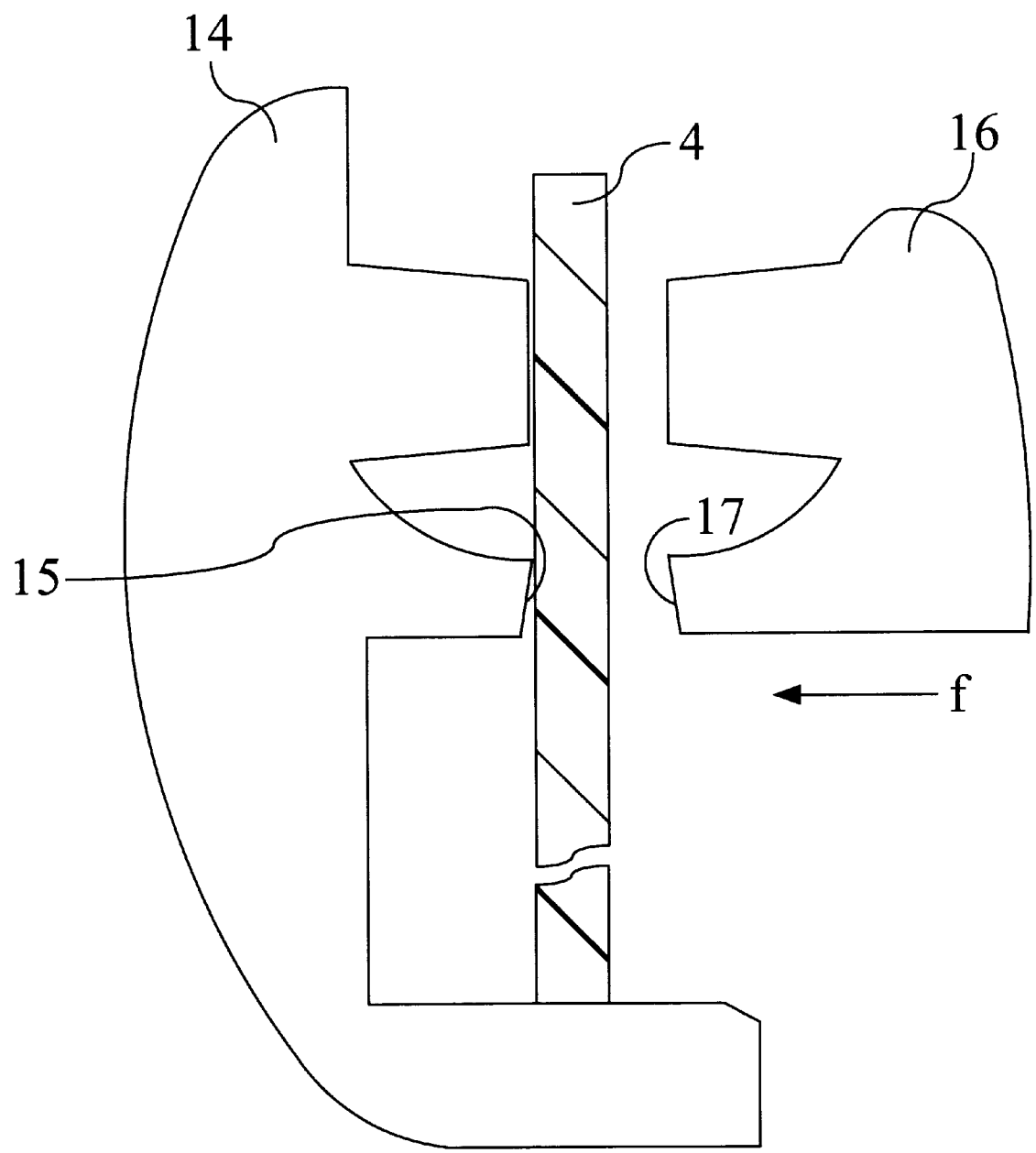
FIGS. 9 and 10 illustrate two stages in the manufacture of a seal as shown in FIGS. 7 and 8, FIG. 9 illustrating a mold, with an inserted PTFE sealing member, in open position and FIG. 10 illustrating the mold in closed position.
Figure 10:
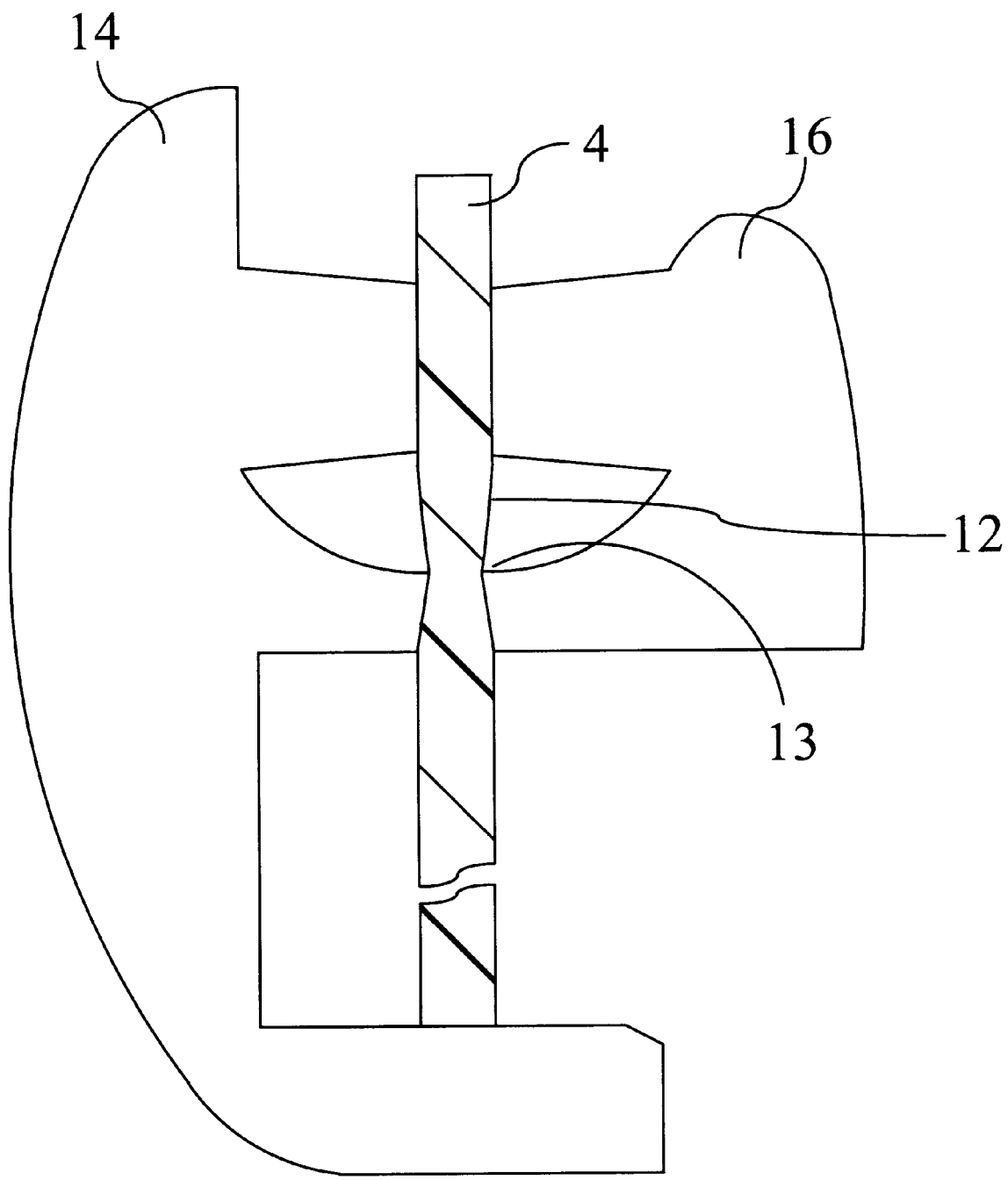

For the sake of simplicity, like reference numerals are used throughout the drawings to mark parts which are identical or have the same functions, more specifically 2 and 2' designate a carrier body made of plastics; 4 and 4' designate a sealing member made of polytetrafluoroethylene (PTFE) compound material (PTFE plastic material modified by such fillers as are customary for sealings); 5 designates slightly conical bores resulting from pins for axially fixing the sealing member 2 in an injection mold; 6 designates a movable structural component which is intended to be sealed—in FIG. 1 a piston rod supported for translatory movement, in FIGS. 2 to 5 and 7 rotary shafts 6, a second shaft to be sealed being marked 6' in FIG. 6; 8 designates a cylinder wall in FIG. 1; 10 designates a protective lip which is integrally formed with the sealing member in FIG. 3; 10' designates a contacting protective lip provided separately from the sealing member 4 in FIG. 4; 10" designates a contactless protective lip as part of the carrier body 2 in FIG. 5; 12 designates a tapered slightly V-shaped constriction or undercut in sealing member 4 according to FIGS. 7 and 8; 13 designates a stamping edge as the deepest place of the undercut 12 at the radially inner edge of the carrier body forming a V-shaped constriction narrowest at the radially inner edge thereof in FIGS. 7 and 8; 14 and 16 designate two mold parts of a mold which are movable with respect to each other to stamp the undercut 12 upon closing of the mold 14, 16 according to FIG. 10 in the direction of arrow f according to FIG. 9; 15 and 17 in FIG. 9 designate facets of the mold parts 14 and 16, respectively; 18 designates a race mounted on the second shaft 6' in FIG. 6 and sealed by a second sealing member 4' which is seated in the same carrier body 2'; 20 designates a sensor or actor inserted in the carrier body 2' shown in FIG. 6; 22 designates snap connectors formed integrally at the carrier body 2' for connection of another component part, not illustrated in the drawing.

A substance-lock connection or bond between the plastic material of the sealing member 4, 4' and the plastic material of the carrier body 2, 2' is obtained by adding to the PTFE compound material of the sealing member a small quantity of the plastic material of which the carrier body is made, or of another substance, especially plastics, which is compatible with the plastic material of the carrier body.

Experiments have shown that at least 0.3% by weight and at most 40% by weight of the plastic material of the carrier body should be added to the PTFE material of the sealing member. The best results both in terms of good sealing properties of the sealing member and a good connection in substance lock (bond) were achieved with an addition of from 5 to 10% by weight. Plastics which proved to be especially well suited to be admixed to the PTFE compound material of the sealing member include polyphenylene-sulfide (PPS), polyamide (PA), and polyethylene (PE). The associated carrier bodies in each case consisted of the respective PPS, PA, or PE. The plastics used for the carrier body and the material mixed with the sealing member need not be identical; they merely must be compatible in the sense of making the substance-lock connection. For example, PE may be added to the PTFE compound material of the sealing member, while the carrier body is injection molded of PA.

Instead of admixing the plastic materials mentioned, the surface of the PTFE sealing member 4 may be modified by incorporation of the plastic material of which the carrier is made or of a plastic material compatible with the same. To accomplish that, the plastic material in question is applied by vapor deposition or plasma polymerization on the surface of the sealing member 4. Preferably, the surface is modified only in that partial area which will be connected directly in substance lock to the carrier body 2. To that end, the sealing member is simply masked during the vapor deposition or plasma polymerization, with the exception of the partial area-in question.

Simple degreasing is sufficient, and the environmentally objectionable, expensive etching of the PTFE sealing member may be dispensed with.

In any case, the sealing member having been modified by the admixture or surface treatment described, is placed in the injection mold to produce the seal. Upon closing of the mold, the plastic material which will form the carrier body is injected into the mold. During this time the sealing member fuses to the plastics of the carrier body as it cools, thereby providing a durable connection in substance lock.

Simultaneously with the closing of the injection mold, the undercut 12 shown in FIG. 8 may be produced in the manner illustrated in FIGS. 9 and 10 by pressing together the mold parts 14, 16 which are formed with facets 15 and 17, respectively. The deepest place of the undercut 12 results at the edge of the carrier body 2 facing the shaft 6 and takes the form of a step or stamping edge 13 (FIG. 8). During the subsequent injection molding, the undercut thus formed is filled with the carrier body plastics so that a connection in mechanical or form lock is established in addition to the substance-lock connection between the carrier body 2 and the PTFE sealing member. In testing, an undercut as embodied in FIG. 8 provided the best results as regards static tightness which is difficult to achieve.

If a connection in form lock is made, the substance-lock connection may be dispensed with, and vice versa.

What is claimed is:

1. A seal comprising a rigid plastic carrier body and a flexible sheet-like sealing member comprising polytetrafluoroethylene, said sealing member having an encased section bonded to and fixedly supported within said carrier body and an exposed section extending outwardly from said carrier body; said carrier body having a V-shaped constriction narrowest at the radially inner edge thereof so that said encased section of said sealing member is locally constricted in a region maintained in compression by said carrier body to mechanically restrain said encased section of said sealing member within said carrier body.

2. The seal of claim 1, wherein said carrier body comprises an injection molded carrier body fused to said sealing member by injection molding of a thermoplastic material.

3. The seal of claim 1, wherein said carrier body exerts a graduated compressive force over said locally constricted region of said encased section.

4. The seal of claim 1, wherein said passage is square-shaped in the direction away from said V-shaped cross sectional area.

5. A seal comprising a rigid plastic carrier body and a flexible sheet-like sealing member comprising polytetrafluoroethylene, said sealing member having an encased section bonded to and fixedly supported within said carrier body and an exposed section extending outwardly from said carrier body; said encased section of said sealing member having a locally constricted region maintained in compression by said carrier body to mechanically restrain said encased section of said sealing member within said carrier body;

wherein said carrier body comprises an injection molded carrier body fused to said sealing member by injection molding of a thermoplastic material; and wherein said sealing member further comprises an intermediary plastic material mixed with said polytetrafluoroethylene, said intermediary plastic material being identical with or chemically compatible with said thermoplastic material of said carrier body.

6. A seal comprising a rigid plastic carrier body and a flexible sheet-like sealing member comprising polytetrafluoroethylene, said sealing member having an encased section bonded to and fixedly supported within said carrier body and an exposed section extending outwardly from said carrier body said encased section of said sealing member having a locally constricted region maintained in compression by said carrier body to mechanically restrain said encased section of said sealing member within said carrier body;

wherein said carrier body comprises an injection molded carrier body fused to said sealing member by injection molding of a thermoplastic material; and further comprising an intermediary plastic material applied to said sealing member and fused to said carrier body, said intermediary plastic material being identical with or chemically compatible with said thermoplastic material of said carrier body.

7. A seal for a rotating shaft comprising:

a sealing member; and a carrier body including a passage; said sealing member having an encased section supported within said passage and an exposed section extending outwardly from said passage; said passage having a gradually reducing cross-sectional area towards said exposed section to retain said sealing member within said carrier body; said passage having a V-shaped constriction with the reduction in cross-sectional area resulting from the inclination of both sides of the carrier and being narrowest at the point of exit of the carrier thereby rendering the grip of the seal tightest at said point of exit.

8. The seal of claim 7, wherein said carrier body comprises two portions, said portions located on opposite sides of said passage thereby constricting said sealing member within said passage.

9. The seal of claim 7, wherein said sealing member and said carrier body comprise chemically compatible materials that fuse together in order to retain said encased section within said passage.

10. The seal of claim 7, wherein said passage is rectangular-shaped in cross section.

11. A seal for a rotating shaft comprising:

a sealing member; and a carrier body including a passage; said sealing member having an encased section supported within said passage and an exposed section extending outwardly from said passage; said passage having a gradually reducing cross-sectional area towards said exposed section to retain said sealing member within said carrier body; wherein said carrier body comprises an injection molded carrier body fused to said sealing member by injection molding of a thermoplastic material; and wherein said sealing member further comprises an intermediary plastic material mixed with said polytetrafluoroethylene, said intermediary plastic material being identical with or chemically compatible with said thermoplastic material of said carrier body.

12. A seal for a rotating shaft comprising:

a sealing member; and a carrier body including a passage; said sealing member having an encased section supported within said passage and an exposed section extending outwardly from said passage; said passage having a gradually reducing cross-sectional area towards said exposed section to retain said sealing member within said carrier body; wherein said carrier body comprises an injection molded carrier body fused to said sealing member by injection molding of a thermoplastic material; and further comprising an intermediary plastic material applied to said sealing member and fused to said carrier body, said intermediary plastic material being identical with or chemically compatible with said thermoplastic material of said carrier body.

* * * * *